Aug. 26, 1952 G. P. DAIGER 2,608,638
ELECTROSTATIC DIELECTRIC HEATING APPARATUS
Filed Jan. 17, 1947 3 Sheets-Sheet 1

INVENTOR.
George P. Daiger
BY
Harry S. Duvall
ATTORNEY.

Aug. 26, 1952  G. P. DAIGER  2,608,638
ELECTROSTATIC DIELECTRIC HEATING APPARATUS
Filed Jan. 17, 1947  3 Sheets-Sheet 2

INVENTOR.
George P. Daiger
BY
Harry S. Dumarse
ATTORNEY.

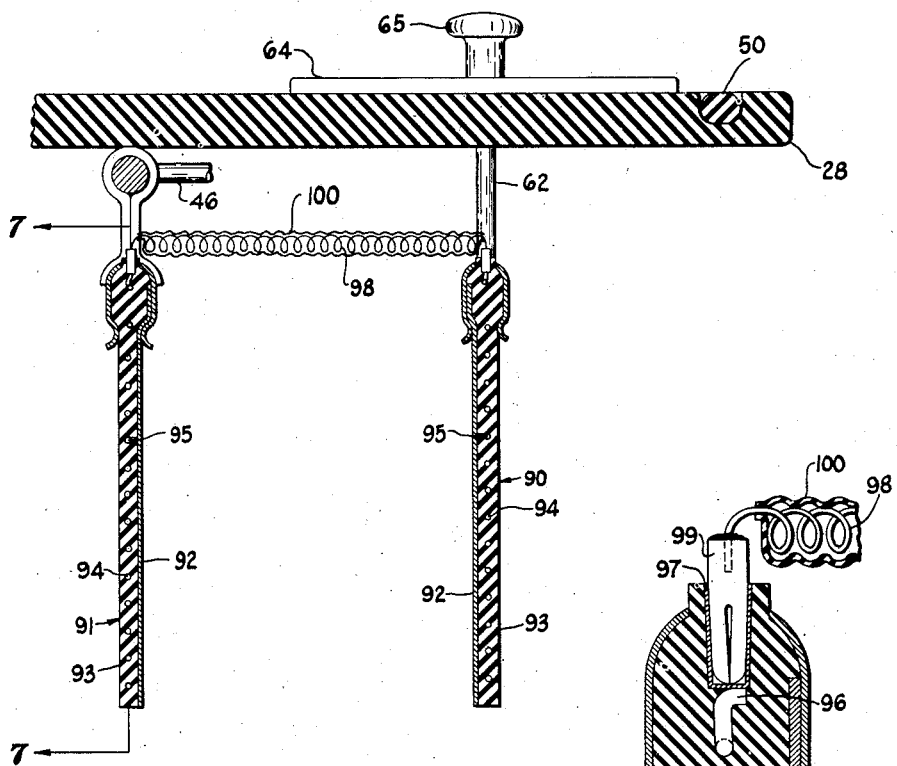
Fig. 6
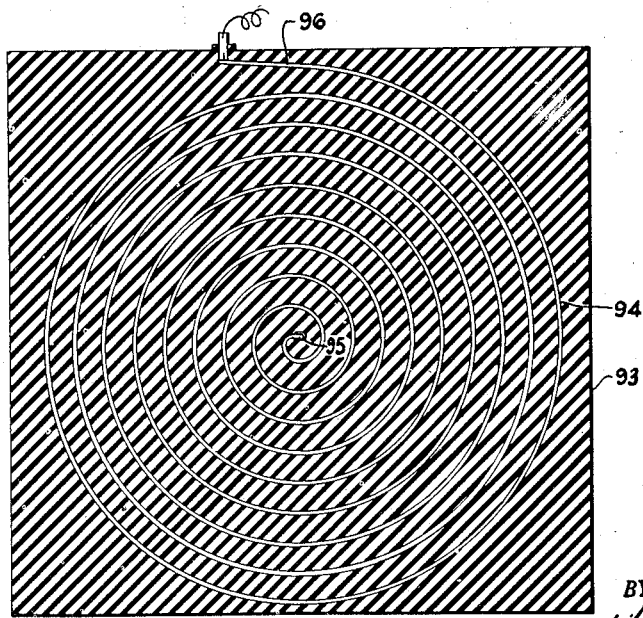
Fig. 7
Fig. 8

Patented Aug. 26, 1952

2,608,638

UNITED STATES PATENT OFFICE 2,608,638

ELECTROSTATIC DIELECTRIC HEATING APPARATUS

George P. Daiger, Canton, Ohio, assignor to The Hoover Company, North Canton, Ohio, a corporation of Ohio Application January 17, 1947, Serial No. 722,559

6 Claims. (Cl. 219—47)

1

The present invention relates to a heating apparatus and more particularly to the type operating in a high frequency electrostatic field.

An object of the invention is to provide a new and improved high frequency electrostatic heating apparatus. Another object is to provide a high frequency heating apparatus for applying greater heat along the outer portion of the material to be heated than in the central area thereof. A further object is to provide a combined induction and high frequency heating apparatus. Another object is to provide a high frequency heating apparatus wherein the electrodes are adjustable relative to the material to be heated. Still another object is to provide a high frequency cooking apparatus which not only sears the exterior areas of meat, but also cooks the meat. Further objects and advantags of the invention will be apparent from the following specification and drawings, wherein:

Figure 6 is a sectional view of another embodiment of the invention showing electrodes having induction coils;

Figure 7 is a section along the line 7—7 of Figure 6; and

Figure 8 is an enlarged sectional view showing the electrical connection to the induction coil.

Figure 1:
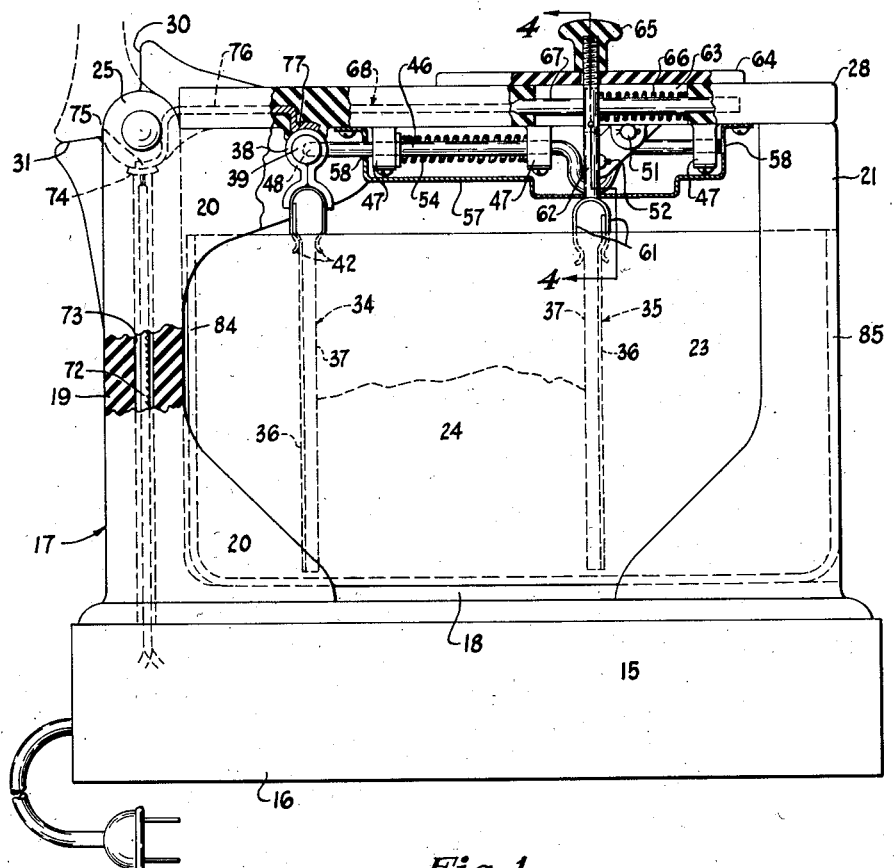
Figure 1 is a side elevational view partly in section of one embodiment of the invention.
Figures 3, 4:
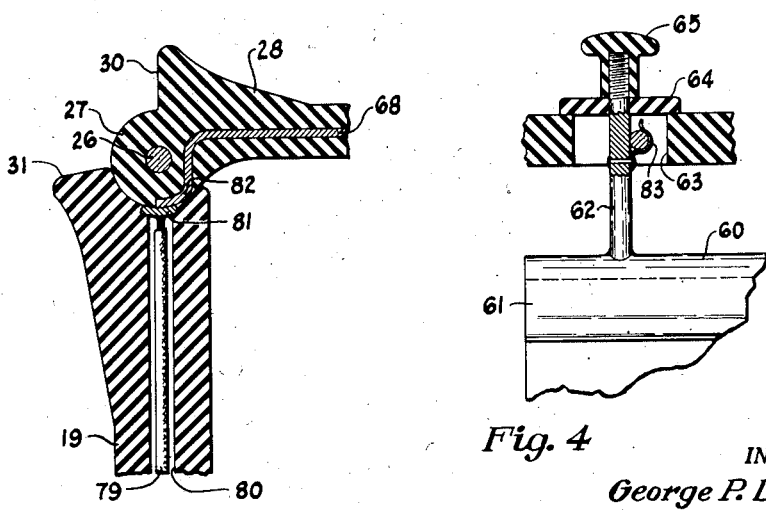
Figure 3 is a section along the line 3—3 of Figure 2.
Figure 4 is a section along the line 4—4 of Figure 1.
Figure 2:
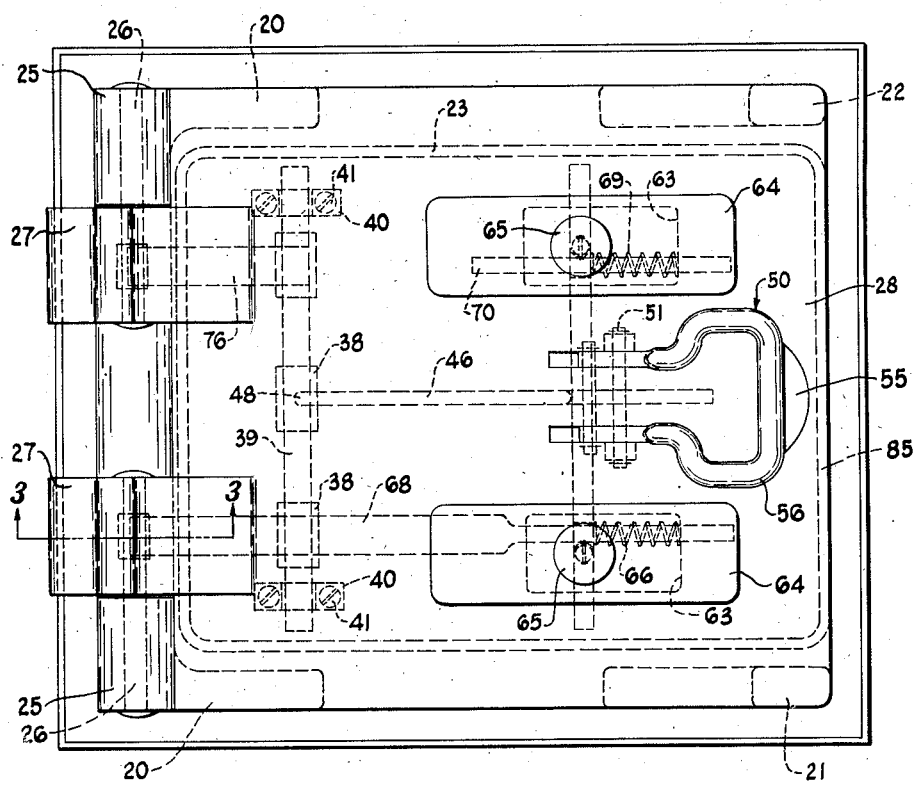
Figure 2 is a top plan view of Figure 1.

The embodiment of the invention disclosed in Figures 1 to 5 comprises a heating apparatus provided with a base 16 in which is disposed an unshown high frequency oscillator 15 of a type well known in the art to supply electric current having a frequency range, for example, from one to fifteen megacycles, and supported on the base 16 is a frame 17 of electric insulating material for supporting heating electrodes. The frame 17 includes a rectangular bottom wall 18, a rear wall 19 provided at its opposite corners with two projecting arms 20, and spaced from the latter at the opposite corners of the bottom wall 18 are cornerposts 21 and 22 which are spaced apart to permit passage of a cooking vessel 23 supported on the bottom wall 18. The cooking vessel 23 is transparent so that the operator can observe the cooking of the meat 24 in the vessel 23.

2

A pair of spaced bosses 25 project upwardly from the top of the rear wall 19 and in each is a pin 26 which extends into arms 27 on a cover 28 to pivot the latter on the rear wall 19. The cover 28 is of electric insulating material and when in closed position, as shown in Figure 1, rests upon the cornerposts 21 and 22. In order to support the cover 28 in an open position as partly shown in dotted lines in Figure 1, the cover 28 and the rear wall 19 are provided respectively with abutments 30 and 31 which are in engagement when the cover 28 is moved to its open position.

Supported on the cover 28 are a rear electrode 34 and a front electrode 35, each of which is provided along one surface with a metal plate 36 and the opposite surface with a high loss dielectric 37. The electrodes 34 and 35 define a heating area therebetween for the meat 24. The rear electrode 34 is attached to the cover 28 by three spaced metal brackets 38 rotatably mounted on a rod 39 rigidly supported in a pair of clamps 40 secured by screws 41 to the underside of the cover 28. Each bracket 38 is rigidly fastened, as by welding, to a spring metal clip 42 extending the full width of the electrode 34 for detachably securing thereto the rear electrode 34 so that the latter can be removed and cleaned. Rotatably supporting the brackets 38 with respect to the rod 39 permits the rear electrode 34 to remain substantially vertical during opening and closing of the cover 28.

In order to rigidly lock the rear electrode 34 with respect to the cover 28, the rod 39 is provided with a slot 44 which is in alignment with an opening 45 in the center bracket 38 when the cover 28 is closed. A plunger 46 is reciprocally mounted in three brackets 47 attached to the cover 28, and one end 48 of the plunger enters the opening 45 and the slot 44 when the cover is closed and rigidly locks the rear electrode 34 and prevents opening of the cover 28. The plunger 46 is operated by a toggle lever 50 pivotally mounted on the cover 28 by a rod 51, and one end of the lever 50 is provided with a pin 52 which engages an offset recess 53 in the plunger 46 to reciprocate the latter when the lever 50 is operated. A spring 54 is disposed about the plunger 46 and urges the latter to its electrode locking position. The upper surface of the cover 28 is recessed at 55 to receive the exterior portion 56 of the lever 50 when the latter is in locked position, and a casing 57 encloses the locking device beneath the cover 28 and is provided at its opposite ends with an opening 58 for passage therethrough of the plunger 46 in spaced relation.

The front electrode 35 is supported on the cover 28 by an elongated bracket 60 having spring metal fingers 61 spaced below the casing 57 for removably securing the electrode thereto. Projecting upwardly from the bracket 60 is a pair of threaded lugs 62 which extend through an elongated opening 63 in the cover 28 to a slidable cover 64 and the threaded lugs are attached to the slidable cover by insulated knobs 65. By grasping the knobs 65 the front electrode 35 may be moved toward and away from the rear electrode 34 to vary the space therebetween, depending upon the size of the meat 24 to be cooked, and the slidable covers 64 close the openings 63 in all adjusted positions of the electrode 35. A spring 66 is disposed about one end portion 67 of an elongated rod 68 which extends through one of the openings 63 and a similar spring 69 is arranged about a rod 70 spanning the other opening 63, and the springs 66 and 69 at all times urge the electrode 35 toward the rear electrode 34 and the meat 24.

Electric current is supplied to the rear electrode 34 by a conductor 72 extending from the high frequency oscillator 15 through an elongated opening 73 in the rear frame wall 19 to an arcuate contact 74, and slidable relative thereto is another contact 75 forming part of a bar 76 embedded in the cover 28 and is connected at its forward end 77 to one of the brackets 38, which in turn is connected through the spring clamps 42 to the metal plate 36 of the rear electrode 34. The front electrode 35 is connected to the high frequency oscillator 15 by a conductor 79 extending upwardly through an elongated opening 80 in the rear frame wall 19 to an arcuate contact 81, and slidable relative thereto is a contact 82 forming part of the elongated rod 68 embedded in the cover 28 electrically connected at its opposite end to one of the projecting lugs 62 by a clamp 83 and then through the spring fingers 61 to the metal plate 36 of the front electrode 35.

In operation when the cover 28 is open as shown in dotted lines in Figure 1, contacts 74—75 and 81—82 are out of engagement, the front electrode 35 projects normal to the cover 28 and the rear electrode 34 is substantially parallel to the cover 28 due to its free pivotal connection in the three brackets 38, and the lever 50 is in its unlocked position. The meat 24 is placed in the vessel 23 and the latter inserted between the front cornerposts 21 and 22 of the frame 17 into the position shown in Figure 1. Upon closing the cover 28 the rear electrode 34 drops vertically between the meat 24 and the rear wall 84 of the cooking vessel 23, while the front electrode 35 passes between the meat 24 and the front wall 85 of the vessel 23. When the cover is closed the lever 50 is moved to its locked position whereby the end 48 of the plunger 46 enters the opening 45 and the slot 44 to rigidly lock the rear electrode 34 with respect to the cover 28 and the meat 24, and also to prevent opening of the cover 28 unless the lever 50 is moved to its unlocked position. The springs 66 and 69 automatically move the front electrode 35 into engagement with the meat 24 and the operator may grasp the knobs 65—65 to assist in positioning the front electrode 35, the meat 24, and the rear electrode 34 relatively to each other with the high loss dielectric surfaces 37—37 in contact with the meat.

When the cover 28 is closed the contacts 74—75 and 81—82 are closed to connect the high frequency oscillator 15 with the electrodes 34 and 35, respectively, and the high frequency oscillator is adjusted to the proper frequency best suited to cook the meat. Upon the application of high frequency current to the electrodes 34 and 35, the meat 24 acts as a dielectric and is heated uniformly throughout its mass by the electrostatic field between the electrodes. The dielectric members 37 on each of the electrodes 34 and 35 are of high loss dielectric material in comparison to the meat 24, and they provide a concentrated temperature higher than that supplied by the electrostatic field and thus function to supply a high temperature for surface cooking to sear the adjacent surfaces of the meat 24.

Figure 5:
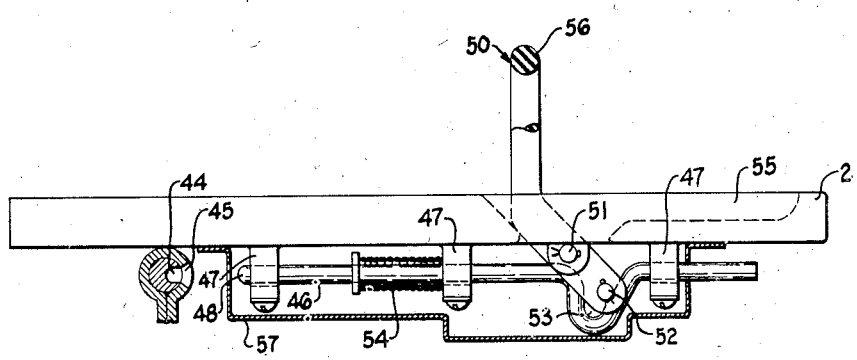
Figure 5 is a view of the means for locking one of the electrodes, the means being shown in unlocked position.

When the meat has been cooked the operator moves the lever 50 to its unlocked position, shown in Figure 5, and opens the cover 28 to the dotted line position, shown in Figure 1, to disconnect the high frequency current and permit removal of the cooking vessel 23. If desired the electrodes 34 and 35 may be removed from their spring clamps 42 and 61 and cleaned.

Another embodiment of the invention is disclosed in Figures 6 to 8 and is similar to the construction previously described with the exception of the electrodes. In this modification of the invention the front and rear electrodes 90 and 91 are each provided along one surface with a metal plate 92 and on the opposite surface with insulation 93 in which is embedded a spiral-shaped induction coil 94 supplied with current from the high frequency oscillator 15. One end 95 of the induction coil 94 is connected to the metal plate 92 and the opposite end 96 is connected to a cup-shaped metal contact 97 embedded in the insulation. To provide an electrical connection between the induction coils 94, an expansible helical wire 98 is supplied at its opposite ends with a plug 99 which is removably inserted in the cup-shaped contacts 97, and an expansible insulation 100 covers the wire 98 so that the front electrode 90 can be properly adjusted with respect to the rear electrode 91 and the meat 24.

When it is desired to cook the meat, the electrodes 90 and 91 are adjusted with respect to each other and the meat in the same manner as described in the first embodiment. The induction coil 94 on each of the high frequency electrodes 90 and 91 heats the metal plates 92 by induction and provides a higher temperature in the metal plates than supplied by the high frequency oscillator 15 to provide a high temperature for surface cooking to sear the meat 24.

I claim:

1. An apparatus for electrically heating an article comprising, a frame supporting the article to be heated, a cover movably mounted on said frame, an electrode depending from said cover, and means mounting an extreme end of said electrode on said cover to depend said electrode into said frame for free pivotal movement with respect to said cover within said frame in one directional plane when said cover is moved to opened and closed positions with respect to said frame.

2. An apparatus for electrically heating an article comprising, a frame supporting the article to be heated, a cover movably mounted on said frame, an electrode, means mounting an extreme end of said electrode on said cover to depend said electrode into said frame for free pivotal movement with respect to said cover within said frame in one directional plane when said cover is moved to opened and closed positions with respect to said frame, and cooperating locking means on said cover and electrode operable when said cover is closed to rigidly lock said electrode with respect to said cover and in said plane.

3. An apparatus for electrically heating an article comprising, a frame supporting the article to be heated, a cover movably mounted on said frame, a pair of electrodes, means on said cover and one of said electrodes mounting the latter on said cover for free pivotal movement with respect to said cover when the latter is moved to opened and closed positions, and means on said cover and the other of said electrodes displaceably mounting the latter on said cover for bodily movement with respect to said one electrode and the article to be heated.

4. Apparatus for heating food comprising: spaced electrodes adapted to receive therebetween the food to be heated, supporting means movably mounted with respect to the food, means pivotally connecting one electrode on said supporting means for pivotal movement with respect to said supporting means when the latter is moved with respect to the food, means diplaceably connecting another electrode on said movable supporting means for relative movement with respect to said one electrode to accommodate the food therebetween, means for locking one of said electrodes with respect to said supporting means, and means for carrying current to said electrodes to heat the food therebetween.

5. Apparatus for heating material comprising: a pair of electrodes adapted to be connected to a source of high frequency potential to produce a high frequency electrostatic field therebetween, means supporting said electrodes in spaced relation to receive the material therebetween, and magnetic means of pancake section connected to said electrodes and disposed against a side of said electrodes and carried thereby to heat said electrodes, whereby said electrodes are heated by said magnetic means to provide a higher localized heat to the material than produced by said electrostatic field.

6. Apparatus for heating material comprising: a frame supporting the material to be heated, a cover for the material, a pivotal connection between said cover and frame for movement of said cover to opened and closed positions with respect to the material, a pair of spaced electrodes carried by said cover and moved therewith for arrangement about the material when said cover is moved to said closed position, and electrical contacts at said pivotal connection controlled by movement of said cover to connect and disconnect said electrodes from a source of current when said cover is moved to closed and opened positions with respect to the material.

GEORGE P. DAIGER.

REFERENCES CITED

The following references are of record in the file of this patent:

UNITED STATES PATENTS

| Number | Name | Date |
| --- | --- | --- |
| 1,572,873 | Allcutt | Feb. 16, 1926 |
| 1,782,069 | Henning | Nov. 18, 1930 |
| 1,797,457 | Weiss | Mar. 24, 1931 |
| 1,806,729 | Aitken | May 26, 1931 |
| 1,873,053 | Shaw | Aug. 23, 1932 |
| 1,921,047 | Sword | Aug. 8, 1933 |
| 1,927,316 | Katzman | Sept. 19, 1933 |
| 1,981,632 | Northrup | Nov. 20, 1934 |
| 2,003,625 | Boyer | June 4, 1935 |
| 2,088,604 | Littlefield | Aug. 3, 1937 |
| 2,280,771 | Dufour et al. | Apr. 28, 1942 |
| 2,388,824 | Brown | Nov. 13, 1945 |
| 2,397,615 | Mittelmann | Apr. 2, 1946 |
| 2,401,991 | Walton et al. | June 11, 1946 |
| 2,413,003 | Sherman | Dec. 24, 1946 |
| 2,442,451 | Albin | June 1, 1948 |
| 2,463,054 | Quayle et al. | Mar. 1, 1949 |
| 2,497,665 | Gravley | Feb. 14, 1950 |

FOREIGN PATENTS

| Number | Country | Date |
| --- | --- | --- |
| 517,798 | Great Britain | Dec. 8, 1940 |

OTHER REFERENCES

"Dielectric Heater Unit," Product Engineering, Aug. 1945, page 526.

Electronic Engineering, August 1945, page 633.